(No Model.)

W. E. CRIST.
BEARING FOR SHAFTS AND PULLEYS.

No. 322,525. Patented July 21, 1885.

Attest:
John A. Ellis
A. B. Moore.

Inventor:
William E. Crist
By David A. Burr
Atty.

United States Patent Office.

WILLIAM E. CRIST, OF NEW YORK, N. Y.

BEARING FOR SHAFTS AND PULLEYS.

SPECIFICATION forming part of Letters Patent No. 322,525, dated July 21, 1885.

Application filed March 12, 1885. (No model.)

*To all whom it may concern:*

Be it known that I, WILLIAM E. CRIST, of the city, county, and State of New York, have invented a new and useful Improvement in Journals and Bearings for Shafts and Pulleys; and I do hereby declare that the following is a full and exact description thereof, reference being had to the accompanying drawings, and to the letters of reference marked thereon, making a part of this specification.

My invention relates to the bearings of rotating or oscillating shafts carrying pulleys, cranks, or fly-wheels upon one end thereof, and has for its object the complete relief of the shaft from all lateral strain or thrust consequent upon the attachment or connection of the pulley, crank, or fly wheel thereto.

It consists in the combination, with a rotating or oscillating shaft, of a stationary concentric sleeve supported independently of the shaft to inclose the end thereof, and whose outer periphery constitutes an axle upon which a pulley, crank, or fly wheel, so secured to the end of the shaft as to partake of its movement, may loosely turn. The inner periphery of the concentric sleeve may serve as a bearing for the shaft.

Figure 1:
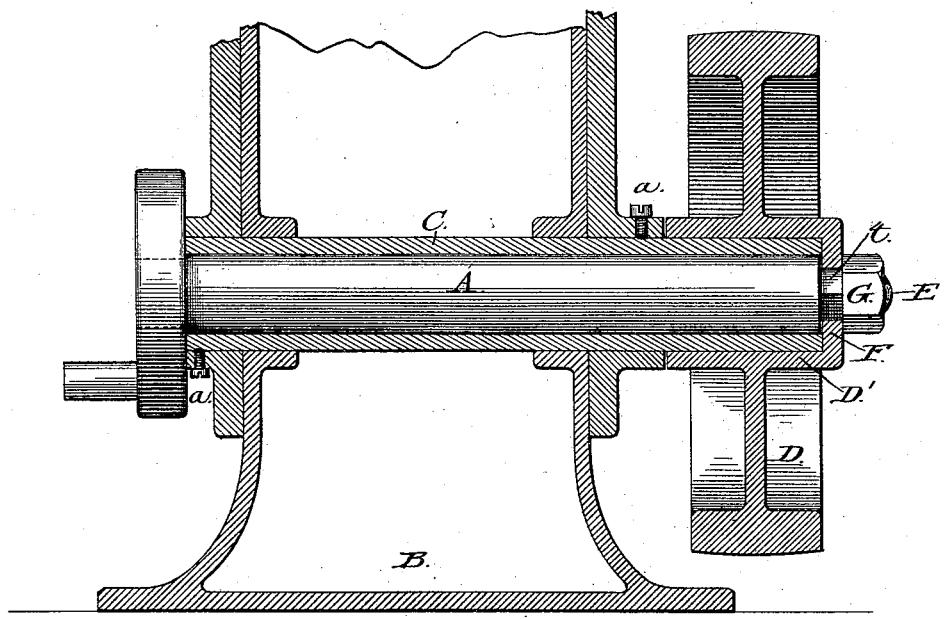
Figure 2:
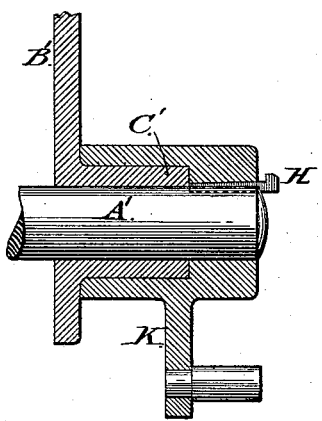
Figure 3:
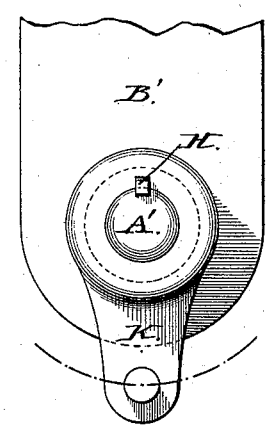

In the accompanying drawings, Figure 1 is a sectional view of a shaft and fly-wheel mounted in accordance with my invention; Fig. 2, a longitudinal section, and Fig. 3 an end elevation, of a crank and shaft embodying said invention.

A represents a rotating shaft mounted in a suitable pedestal or pillow-block, B, to rotate in a longitudinal sleeve, C, fixed in said pedestal and constituting a bearing for the shaft. This concentric sleeve C is secured in the pedestal B by means of one or more set-screws, *a a*, and is extended at one end beyond its bearing in the pedestal far enough to serve as an axle for a loose pulley or fly wheel, D, and is made strong enough to fully support and resist the weight and tension of the said pulley or fly wheel.

The end of the shaft A is carried to the end of the sleeve C and terminates in a pin, E, having an angular base and a threaded extremity. The outer end of the hub D' of the loose pulley D is closed by a cap-plate, F, secured upon or made integral therewith, and which is formed centrally with an angular recess or opening adapted to fit closely upon the angular shoulder *t* of the pin E. The pulley D is made fast to the shaft A by means of a nut, G, screwing upon the end of the pin E, whose angular base, engaging the plate F of the hub of the wheel, causes the wheel to rotate with the shaft.

Many equivalent devices will suggest themselves to a skilled mechanic for connecting and securing the pulley D rotating upon the fixed sleeve-axle C to the shaft A rotating within said sleeve—as, for instance, by a key, H, inserted in a recess between the shaft and hub to lock the two together, as shown in Fig. 2; and I contemplate the use of any well-known method of accomplishing this end.

The sleeve-axle may be formed integrally with a pedestal, or a hanger, B', (see at C' in Fig. 2,) to support an oscillating crank, K, mounted upon the sleeve-axle C, and made fast to the end of a shaft, A', rocking within said tubular axle. By mounting the sleeve-axle so that it will admit of being moved independently about its axis, as shown in Fig. 1, it may be turned occasionally to compensate for the wear upon one side thereof due to the constant downward lateral pressure thereon arising from the weight of the pulley and shaft.

I claim as my invention—

1. The combination, with a stationary sleeve-axle and a loose pulley, crank, or fly wheel turning thereon, of a rotating shaft projecting through said axle and made fast to the pulley, crank, or wheel, so that the two shall turn together, substantially in the manner and for the purpose herein set forth.

2. The combination, with a cylindrical sleeve forming an extended journal-box and mounted to turn for adjustment about its axis in a suitable pillow-block or hanger, and with a shaft rotating in said sleeve, of a loose wheel, crank, or pulley turning upon the end of the sleeve and made fast to the projecting end of the shaft, substantially in the manner and for the purpose herein set forth.

In testimony whereof I have signed my name to this specification in the presence of two subscribing witnesses.

WILLIAM E. CRIST.

Witnesses:
P. ELBERT NOSTRAND,
A. B. MOORE.